US007657439B2

(12) United States Patent
Kadaba (10) Patent No.: US 7,657,439 B2
(45) Date of Patent: Feb. 2, 2010

(54) SYSTEM AND METHOD FOR SHIPPING A MAIL PIECE HAVING POST OFFICE BOX RECOGNITION

(75) Inventor: Nagesh Kadaba, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 646 days.

(21) Appl. No.: 11/379,241

(22) Filed: Apr. 19, 2006

(65) Prior Publication Data

US 2007/0250326 A1    Oct. 25, 2007

(51) Int. Cl.
*G06Q 10/00* (2006.01)
*G06F 17/00* (2006.01)

(52) U.S. Cl. .............................. 705/1; 705/401; 705/26; 705/39; 235/384

(58) Field of Classification Search ................. 705/404, 705/1, 401, 39, 26; 707/104.1; 235/384
See application file for complete search history.

(56) References Cited

U.S. PATENT DOCUMENTS

| | | | | |
|---|---|---|---|---|
| 5,454,038 | A * | 9/1995 | Cordery et al. | 705/60 |
| 6,292,709 | B1 | 9/2001 | Uhl et al. | |
| 6,549,892 | B1 * | 4/2003 | Sansone | 705/401 |
| 7,376,598 | B2 * | 5/2008 | Estes et al. | 705/26 |
| 2002/0029202 | A1 | 3/2002 | Lopez | |
| 2003/0208411 | A1 * | 11/2003 | Estes et al. | 705/26 |
| 2004/0004119 | A1 * | 1/2004 | Baldassari et al. | 235/384 |
| 2004/0138817 | A1 * | 7/2004 | Zoken et al. | 702/5 |
| 2004/0215480 | A1 * | 10/2004 | Kadaba | 705/1 |
| 2004/0220888 | A1 | 11/2004 | O'Martin et al. | |
| 2005/0004882 | A1 * | 1/2005 | Teichgraber et al. | 705/404 |
| 2006/0235710 | A1 * | 10/2006 | Hodess et al. | 705/1 |
| 2007/0062851 | A1 | 3/2007 | Schulz et al. | |
| 2007/0088749 | A1 * | 4/2007 | Lorch et al. | 707/104.1 |
| 2007/0124241 | A1 * | 5/2007 | Newton | 705/39 |

FOREIGN PATENT DOCUMENTS

| | | | |
|---|---|---|---|
| EP | 1053798 | * | 11/2000 |
| EP | 1053798 A2 | | 11/2000 |
| JP | 2001129488 | * | 5/2001 |

OTHER PUBLICATIONS

Wikipedia, "Post Office box," www.wikipedia.org, Feb. 3, 2006, pp. 1-3.*
"Post Office Box," www.everything2.com, Apr. 14, 2004.*
International Search Report Dated Sep. 21, 2007, Regarding Corresponding International Appl. No. PCT/US2007/009453.

* cited by examiner

*Primary Examiner*—John W Hayes
*Assistant Examiner*—Brian Epstein
(74) *Attorney, Agent, or Firm*—Alston & Bird, LLP (57) ABSTRACT

This application discloses a method and system for facilitating the delivery of a mail piece bearing a post office box identifier to a United States Postal Service Branch, for final delivery to a post office box. The system facilitates the delivery by scanning the mail piece and obtaining the mail piece's destination information. If the destination information includes a post office box identifier, e.g., P.O. Box #1234, the system determines a street address of the post office location containing P.O. Box #1234. The street address is determined using the zip code contained within the destination information. Once the street address is determined, a new label, bearing the street address of the USPS branch location is affixed to the mail piece so that the mail piece can be delivered to the consignee.

19 Claims, 8 Drawing Sheets

SYSTEM AND METHOD FOR SHIPPING A MAIL PIECE HAVING POST OFFICE BOX RECOGNITION

FIELD OF THE INVENTION

The present invention relates generally to the technology of mail and parcel delivery and more particularly to systems, devices, processes and methods for facilitating the delivery of mail destined for a United States Post Office Box.

BACKGROUND OF THE INVENTION

It is common for individuals and businesses (hereinafter consignors) to send mail pieces to P.O. Boxes. It is likewise common for consignors to ask commercial carriers (e.g. UPS) to facilitate the delivery of mail pieces to P.O. Boxes. However, the consignor often does not realize that only the United States Postal Service (USPS) is authorized to deliver mail to a post office box. In other words, only the U.S. government is allowed to physically place mail into a Post Office Box. Thus, in the past, when a commercial carrier received a mail piece addressed to a USPS Post Office Box, the commercial carrier would typically have two delivery options. The first option was to find an alternate consignee address. To do so, the carrier would search for an alternative street address using the consignee's name and Zip Code. For example, if the mail's address delivery field indicated that the mail was addressed to Jane Smith at P.O. Box 1234, Atlanta Ga., 30309, the commercial carrier would search a database to determine if a street address existed for "Jane Smith" within the 30309 zip code. If an alternative street address existed, the carrier would re-label the package bearing the alternative street address and deliver the mail piece to that address. This procedure often resulted in mail being delivered to the wrong address. Furthermore, it was often the case that the consignee's reason for obtaining a post office box was that the consignee did not want mail delivered to the alternative address. Moreover, locating an alternative address often proved difficult. Ultimately, if the carrier could not locate an alternative delivery address, or more than one alternative address was found, the carrier would have to resort to the second option, returning the mail piece to the consignor.

In light of these problems, there exists a need in the art for a system and method by which a commercial carrier can facilitate the deliver of mail to a post office box. The present invention solves these limitations by providing such a method.

BRIEF SUMMARY OF THE INVENTION

Various embodiments of the present invention address the above-described problems by providing methods and systems for facilitating the delivery of a mail piece bearing a post office box identifier by a commercial carrier to the United States Post Office, for final delivery by the USPS to the consignee's post office box.

One embodiment of such method comprises the steps of (1) scanning a mail piece to obtain destination information; (2) determining whether the destination information includes a post office box identifier; (3) if the mail piece includes a post office box identifier, determining a street address of a post office location containing said post office box; and (4) affixing a street address of the post office location to the mail piece.

Another embodiment of the present invention is a mail delivery system for facilitating the delivery of a mail piece bearing a post office box identifier, wherein the mail delivery system comprises (1) a mail piece scanning apparatus configured to determine destination information located on the mail piece; (2) a post office box recognition system connected in communication with the mail piece scanning apparatus, configured to determine if a post office box identifier is included within the destination information; wherein the post office box identifier identifies a post office box; (3) a post office box conversion system configured to determine a street address of a post office location containing the post office box; and (4) an addressing system configured to address the mail piece with at least the street address of the post office location containing the post office box.

In another embodiment of the present invention, a method of delivering a mail piece to a post office box comprising the steps of: (1) a first party taking possession of a mail piece; wherein the mail piece includes designation information in the form of a post office box identifier; (2) scanning the mail piece to obtain the destination information; (3) determining if the destination information contains a post office box identifier; if the destination information contains a post office box identifier, associating the post office box identifier with a street address of a post office location containing the post office box; and (4) printing a label containing the post office location's street address.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

As described above, the present invention provides a means by which a commercial carrier (other than the USPS) can facilitate delivery of one or more mail pieces to a post office box. As used herein, the term "mail piece" is defined to include any item that can be delivered to a post office box, including but not limited to packages, envelopes, postcards, and containers. The term "post office box" is defined as a storage unit assigned to a consignee, for the purpose of storing mail pieces. Post office boxes are available in various sizes. In many instances, a mail piece is too large to fit within a post office box. Under these circumstances, the mail piece is held in a in a separate storage area within the USPS branch, for pickup by the consignee. As such, the term post office box is defined to also include an identification to pick up an item being held by the USPS outside of the post office box.

Figure 1:
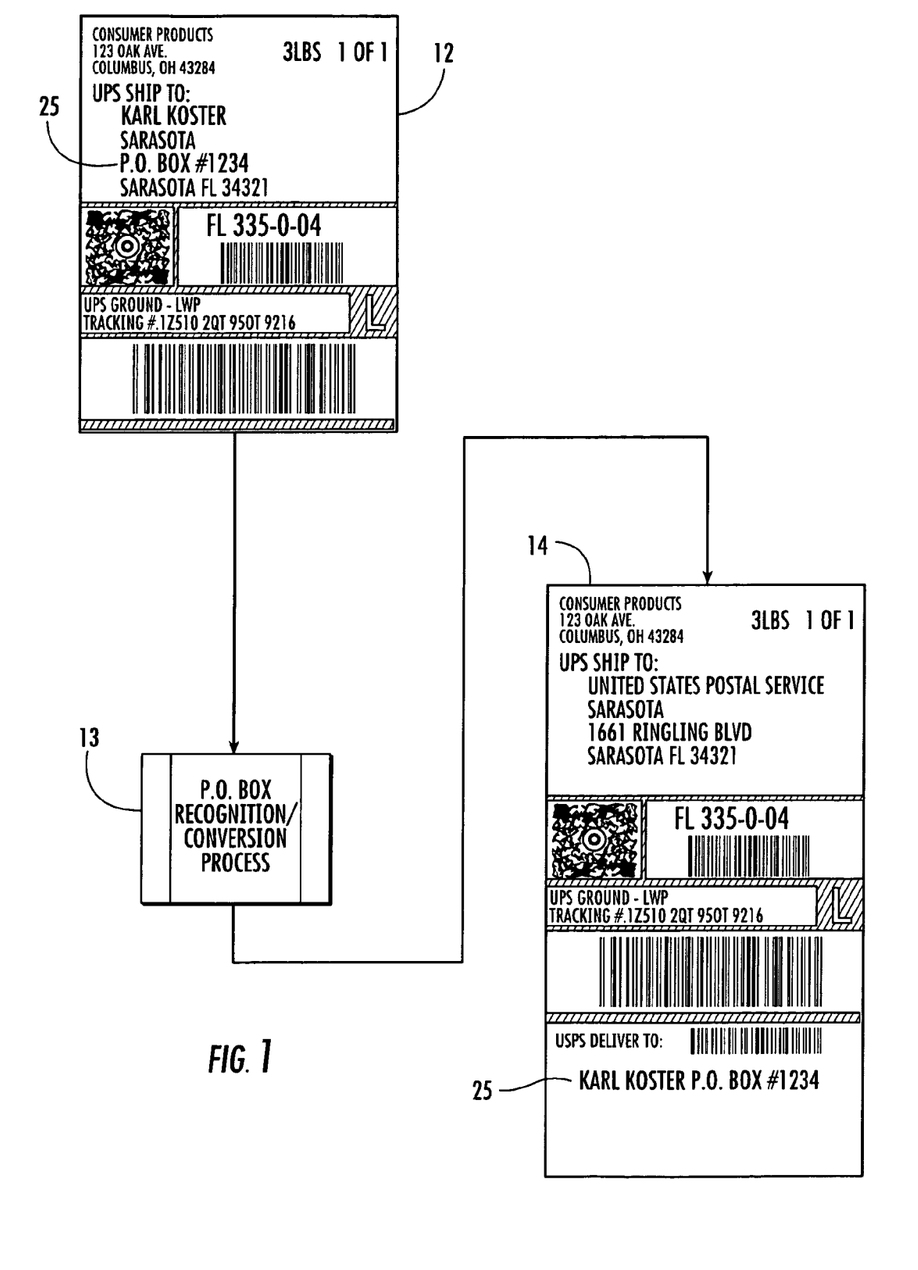
FIG. 1 is a schematic depiction of one embodiment of the present invention in which the destination information of a first label (bearing a post office box identifier) is converted into a street address of a USPS branch location and printed onto a second label.

Although a commercial carrier is not authorized to deliver a mail piece directly to a post office box, it can deliver the mail piece to the USPS branch location that contains the consignee's post office box. To facilitate delivery to a post office box, the present invention is generally directed to a method and system for (1) recognizing that a mail piece is destined for a post office box; (2) converting the post office box identifier to the street level address of the post office branch containing the consignee's post office box; and (3) facilitating placement of the mail piece into the post office box by the USPS. FIG. 1 illustrates one embodiment of the present invention in which the destination address of a first label 12 is converted into a street level address of a USPS branch location containing the post office box referenced on the first label 12. As shown in the address field of the first label 12, when a shipper/consignor desires to ship a package to a post office box, he or she typically fills out a shipping label such that the destination address includes a post office box identifier 25.

In the embodiment shown in FIG. 1, the Post Office Box identifier is in the form "P.O. Box #1234." In order for a commercial carrier to facilitate delivery of a mail piece addressed to a post office box, the destination address of the first label 12 (bearing the P.O. Box #1234 identifier) is converted, via a P.O. Box recognition/conversion process 13 (one embodiment of which is described in greater detail below), to a second label 14, wherein the second label 14 includes the street level address of the USPS branch location that contains the identified post office box. For example, in the embodiment shown in FIG. 1, the destination address information of the first label 12 (Karl Koster, P.O. Box #1234, Sarasota Fla. 34321) is converted to a street level address and placed on the second label 14 (United States Postal Service 1661 Ringling Blvd. Sarasota Fla. 34321). The second label also bears the post office box identifier 25, preferably in a separate portion of the label.

P.O. Box Recognition/Conversion Process

Figure 2:
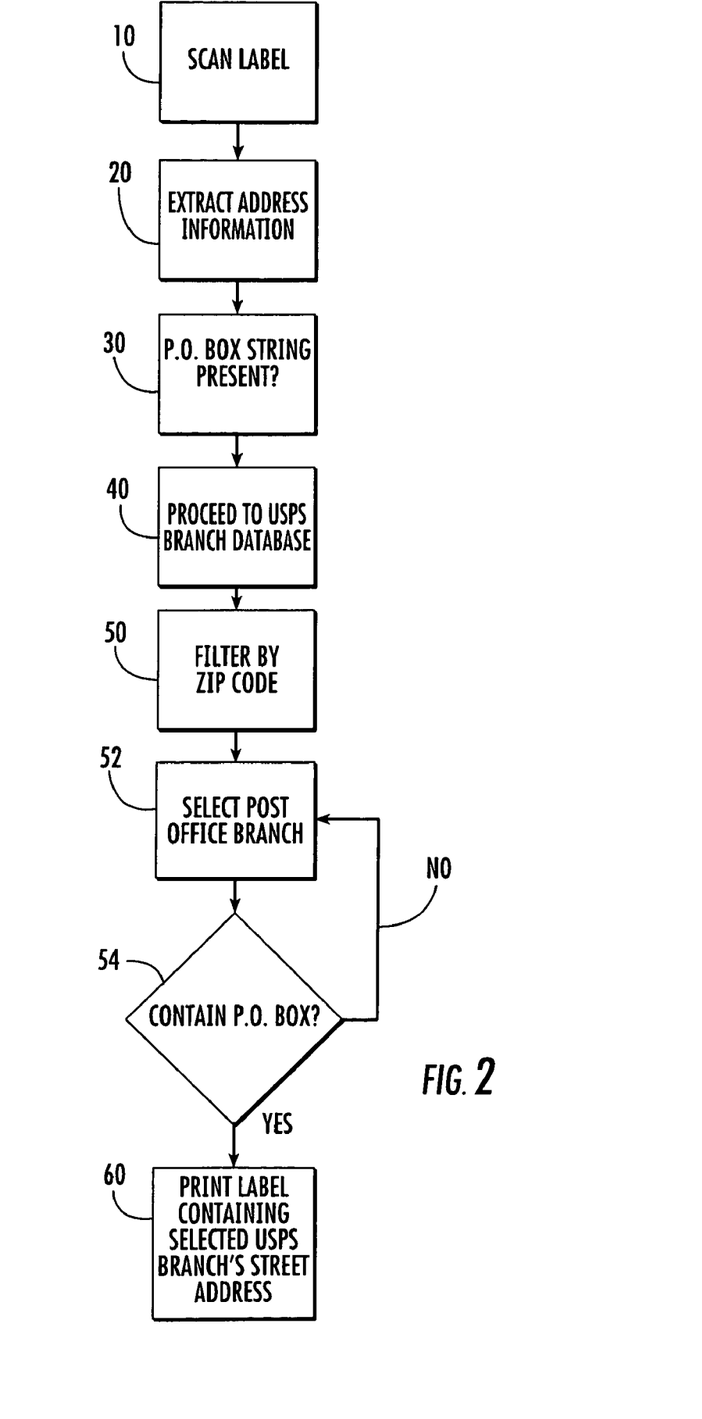
FIG. 2 is a flowchart illustrating one embodiment of the Post Office Box Recognition and Conversion process.

One embodiment of the P.O. Box recognition/conversion process 13 is illustrated in FIG. 2. According to the embodiment depicted in FIG. 2, the P.O. Box recognition/conversion process begins at Step 10, when the shipping label affixed to the mail piece is scanned by a scanning apparatus. The scanning apparatus is configured to optically scan, or otherwise electronically obtain, information located on the mail piece. The information may include printed, typed, or bar-coded information located on the surface of the mail piece. In one embodiment, the scanning apparatus employs standard bar coding or OCR techniques. In another embodiment, the mail piece may also include an RF transmitter (e.g., an RFID tag) that is configured for transmitting the information via an RF signal. In this case, the scanning apparatus may obtain the information by receiving and decoding the RF signal.

The scanning apparatus is further configured to extract the destination address information from the shipping label, as shown in Step 20. At Step 30, the conversion process determines whether a P.O. Box string is present within the destination address information. The term "P.O. Box string" includes any derivation or shorthand by which a consignor might refer to a Post Office Box, including, but not limited to "Post Office Box #1234, "P.O. Box #1234, " "PO Box #1234, " or PO #1234."

If a P.O. Box string is present within the destination address information, the conversion system accesses a USPS branch location database 91, shown in FIG. 7, containing address information for USPS branch locations (Step 40). Using the Zip Code and P.O. Box string extracted at Step 20, the system is able to locate the specific USPS branch that contains the destination post office box. Locating the specific USPS branch is accomplished via a USPS branch location database 91 and a process illustrated in Steps 50, 52, and 54. One embodiment of the USPS branch location database 91 comprises a list of USPS Branches sorted by zip code, as shown immediately below.

Figure 7:
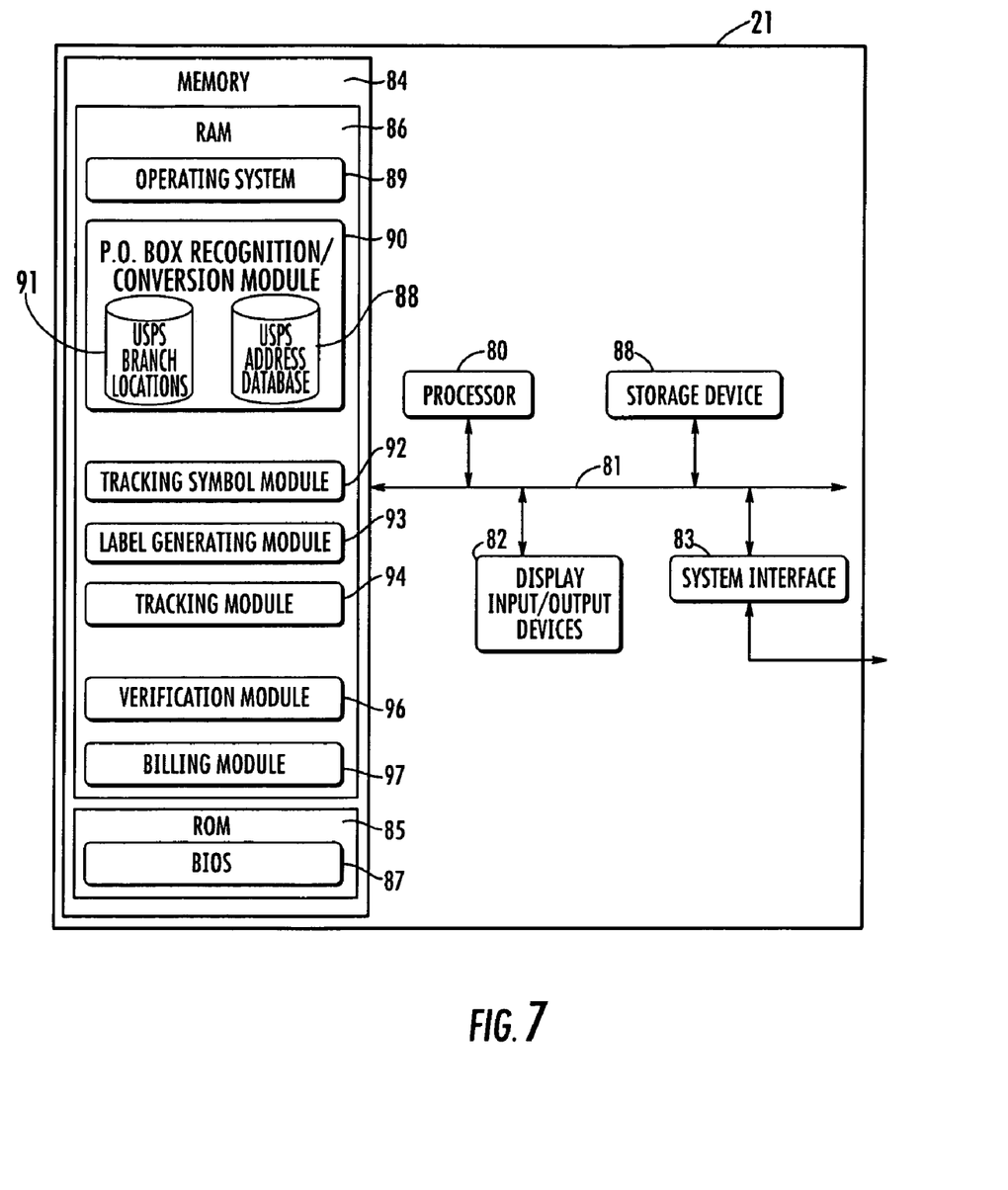
FIG. 7 is an alternative schematic depiction of the computer system shown in FIG. 6.

| Zip Code | USPS Branch | Branch Address | P.O. Box String |
| --- | --- | --- | --- |
| 30309 | ATL-01 | 21 Howell Mill Rd. | 100-350 |
| 30309 | ATL-02 | 34 Paces Rd. | 400-800 |
| 30309 | ATL-11 | 105 Peachtree Rd. | 900-1500 |
| 30319 | ATL-13 | 121 Lenox Rd. | 01-599 |
| 30319 | ATL-14 | 221 Glenlake Pkwy. | 699-1199 |
| 30327 | ATL-15 | 333 Deering Rd. | 100-600 |
| 30327 | ATL-35 | 24 $10^{th}$ Street | 601-1100 |
| 30327 | ATL-38 | 245 $14^{th}$ Street | 1101-1500 |
| 30308 | ATL-56 | 878 Peachtree Rd. | 01-1000 |
| 34321 | SRA-03 | 1661 Ringling Blvd. | 01-1500 |
| 34321 | SRA-05 | 213 Main Street | 1501-3000 |

In this particular embodiment of the USPS branch location database 91, each USPS branch includes an address and P.O. Box String. The P.O. Box String comprises a list of post office boxes contained within the particular USPS branch location. In the embodiment shown above, the P.O. Box String is shown as a range, e.g. 601-1100. In other embodiments (not shown), the post office box numbers for each branch location are listed separately and sequentially, e.g., 606, 602, 603 . . . 1100.

At Step 50, a zip code filtering process, using the zip code extracted at Step 20, is applied to the database of USPS branches 91. As shown below, the zip code filtering process returns a set of USPS branches that are either located within, or provide service to, the zip code extracted at Step 20. For example, in the embodiment shown in FIGS. 1 and 3, where the zip code extracted at Step 20 is 34321, the zip code filtering process (Step 50) would return the following set of USPS branches, all of which are either located within, or provide service to the 34321 zip code.

| Zip Code | USPS Branch | Branch Address | P.O. Box String |
| --- | --- | --- | --- |
| 34321 | SRA-03 | 1661 Ringling Blvd. | 01-1500 |
| 34321 | SRA-05 | 213 Main Street | 1501-3000 |

Once the zip code filtering process culls down the list of USPS locations, the P.O. Box recognition/conversion process 13 proceeds to Step 52. At Step 52, a first post office branch is selected from the set of branches returned following the application of the zip code filter. For example, the USPS branch named SRA-03 could initially be selected at Step 52. At Step 54, the system determines whether the selected branch (SRA-03) contains the post office box identified by the P.O. Box string extracted at Step 20. If the selected USPS branch does not contain the destination post office box, the system returns to Step 52 and selects a second post office branch from the set of branches returned by the zip code filter at Step 50. The system repeats Steps 52 until the answer to step 54 is "yes," indicating that the selected post office branch contains the destination post office box. Using either the USPS branch location database 91 or a separate look-up table 88 containing address information for each USPS branch location, the street level address of the USPS branch identified at Step 54 is determined and subsequently printed onto a label at Step 60.

If the consignee lives in a rural area, it is possible that only a single USPS branch location exists within the extracted zip code. In such a situation, the zip code filter will return a single post office branch location. However, in many instances, the zip code extracted from the destination address information at Step 20 will include multiple USPS branches. When multiple branch locations serve a single zip code, Steps 52 and 54 of the conversion process could conceivably go through multiple iterations before locating the USPS branch location containing the destination post office box.

Use of the P.O. Box Recognition/Conversion System during the Pre-Loading Process One embodiment of the present invention is used to convert a Post Office Box identifier into a street level address for use at a commercial carrier's local sortation hub, or "hub" for short, in loading the mail piece onto a delivery vehicle for delivery, during a process often referred to in the art as the "pre-load sortation" process. Pre-load sortation is a process in which employees of the carrier, referred to herein as pre-loaders, load packages onto delivery trucks for delivery to the ultimate destination. A typical hub generally has a plurality of package cars that are being pre-loaded simultaneously. In addition, each package car is equipped with a plurality of shelves to hold the packages to be delivered.

Pre-loaders have the responsibility of ensuring that the packages are loaded on the correct shelf of the correct package car. In the past, the pre-load sortation process has been used to simplify the pre-load operations by providing a handling instruction for every package handled by a pre-loader. The handling instruction indicates the route (delivery vehicle) and the load position within the delivery vehicle for loading the package.

Figure 3:
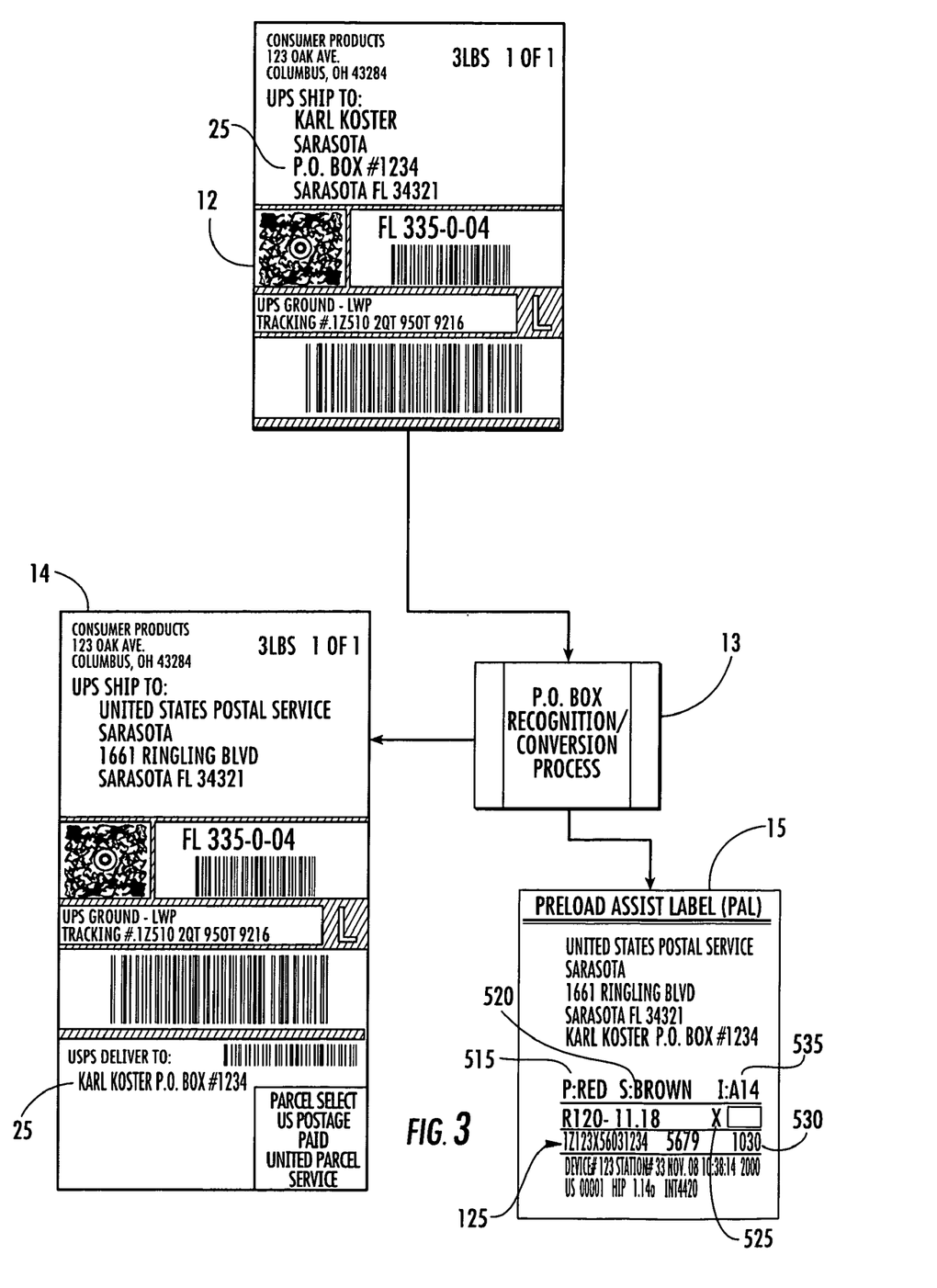
FIG. 3 a schematic depiction of one embodiment of the present invention in which the destination information of a first label (bearing a post office box identifier) is used to prepare: (1) a second label bearing the street address of a USPS branch location and (2) a third label used in connection with the loading of a delivery vehicle.

The present invention is well suited for the pre-load environment. As illustrated in FIG. 3, it is common for a mail piece to arrive at a local sortation hub affixed with a shipping label 12 that includes a post office box string in the address field. As illustrated in FIG. 3, the mail piece's shipping label 12 includes the post office box string "P.O. Box #1234" in the address field. Upon arrival at the local sortation hub, the P.O. Box recognition/conversion process 13 is utilized to convert the shipping label 12, addressed to P.O. Box #1234, into a second shipping label 14, which includes the street level address of the post office branch containing P.O. Box #1234 and the post office box identifier 25.

As described in reference to FIG. 2, the P.O. Box recognition/conversion system 13 begins when the first shipping label 12 is scanned. In the context of a pre-load sortation process, the scanning can occur manually, by a pre-loader, or automatically, as the mail piece is conveyed along a conveyor system known in the art. When the first shipping label 12 is scanned, the system will detect the presence of a post office box string within the extracted address information. When a post office box string is detected within a label's address fields, the system uses the destination zip code to filter a database of United States Post Office branches. The filter returns only those branches that are located within the zip code extracted from the shipping label's address field. Thus, in the embodiment shown in FIG. 3, the system would only return those USPS branches located that the 34321 zip code. Once filtered, the specific branch containing P.O. Box #1234 must be determined according to the embodiment illustrated in FIG. 2, so that the mail piece can be loaded onto the appropriate delivery vehicle. Identifying the specific branch is done by determining which USPS branch contains the destination post office box. Once the system matches a USPS branch to the destination post office box, a second shipping label 14 is printed bearing the street level address of the selected USPS branch. The street level address is obtained from a database of USPS branch addresses. In the embodiment illustrated in FIG. 3, the USPS branch located within zip code 34321 that contains P.O. Box #1234 is located at 1661 Ringling Blvd, Sarasota Fla. 34321. The second shipping label 14, bearing the 1661 Ringling Blvd address and the post office box identifier 25, is then affixed to the mail piece. It should be understood that the address information may be found on a label, affixed directly on the mail piece, or in the form of an RFID tag. Likewise, the information necessary to facilitate the delivery of the mail piece 12 to the destination post office box (including the street level address information) can also be placed directly on the mail piece, in the form of a human readable label or an RFID tag.

In addition to the second shipping label 14, a third label, otherwise known as a preload assist label 15, may also be produced. A preload assist label 15 includes handling instruction that indicate the route (delivery vehicle) and the load position within the delivery vehicle for loading the package. Using the USPS branch's address information, a pre-load sortation tool receives the Post Office Address as input and compares the address against a dispatch plan to determine which delivery truck is assigned to deliver to the destination address and which shelf on the delivery truck will hold those packages that are delivered to that address. The PAS tool then generates a package assist label (PAL) 15, as shown in FIG. 3.

The PAL is a mechanism for conveying the pre-load handling instructions. FIG. 3 illustrates a PAL in accordance with one embodiment of the invention. In this example, three digits on the left side of the PAL ("120") indicate the delivery vehicle and rout for loading the package. The four digits that follow the hyphen ("1118") indicate the load position, sometimes known as a shelf position, within the delivery vehicle for loading the package. Other information that is present on the PAL illustrated is a package tracking number 225, primary 515 and secondary 520 package sortation information, a low to high indicator 525, a commit time 530 and an irregulr drop-off indicator 535. In one embodiment, the primary 515 and secondary 520 sortation numbers identify the primary and secondary sortation belts for the package.

The presence of this information on the PAL simplifies the movement of the package to the sortation belt that delivers the package to the package car. The low to high indicator 525, indicates an order for loading a package care and in one embodiment is based on a primary street number of the package destination address. Thus, if a street range is given a handling instruction (i.e. 1-10 Main Street as R120-1888), if a low to high indicator 525 is set the packages are loaded from 1-10. On the other hand, if a low to high indicator 525 is not set, packages are loaded high to low (10-1 in this example).

Use of the Present Invention within a Mail Shipping System

Figure 4:
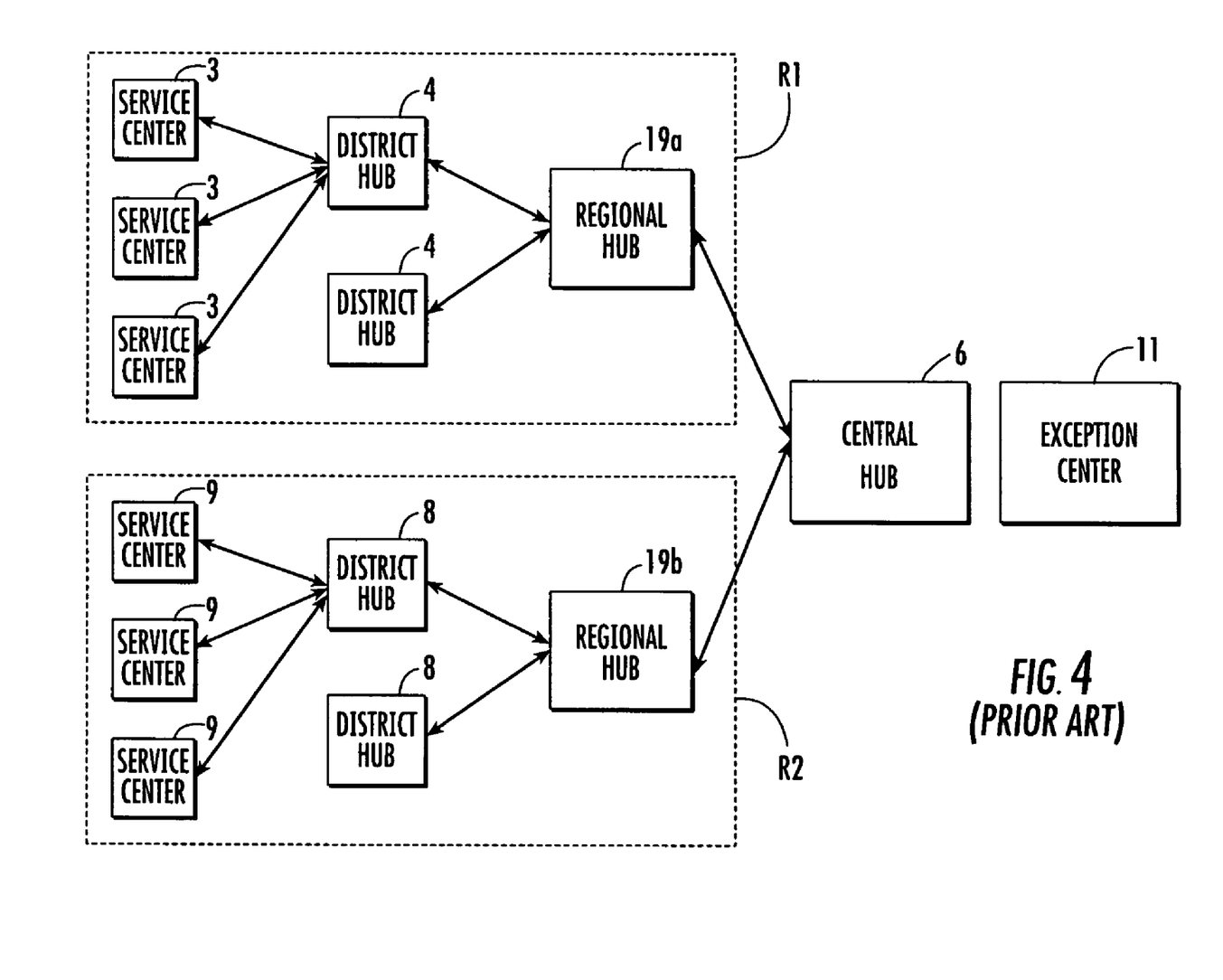
FIG. 4 is a diagram showing transit point relationships for movement of a mail piece during shipping and handling within a mail shipping system as taught by the prior art.
Figure 5:
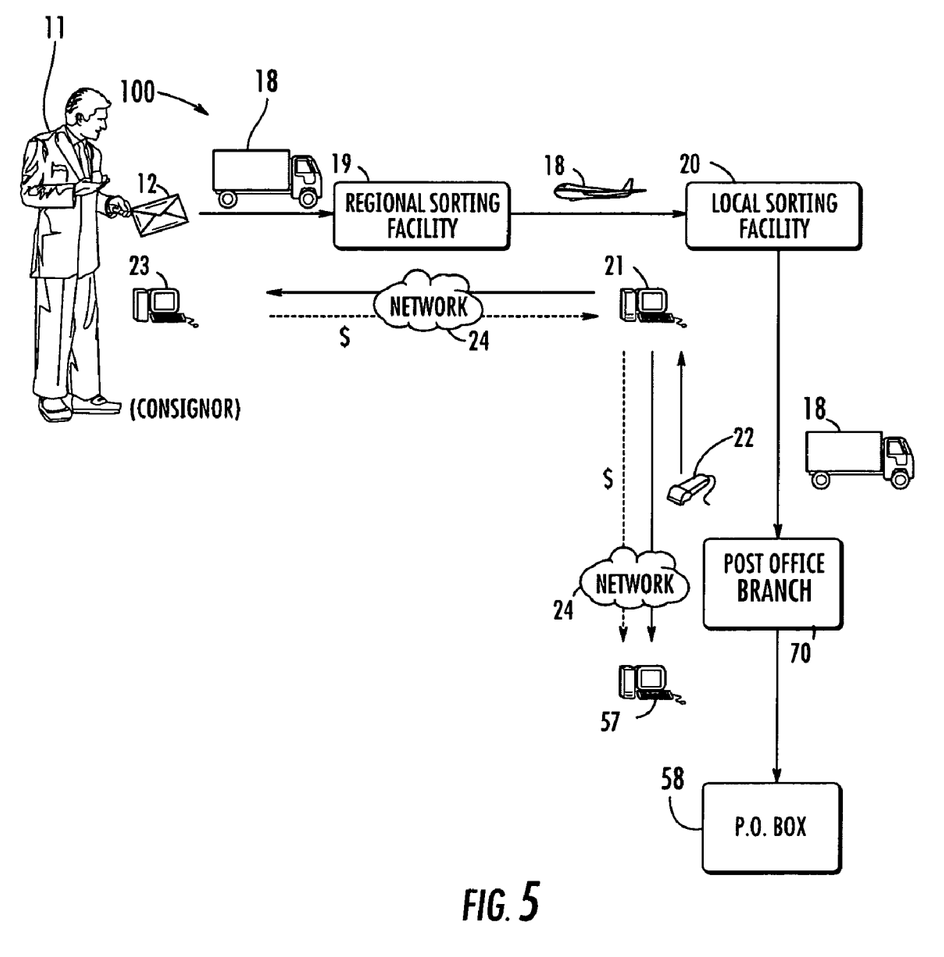
FIG. 5 is a schematic depiction of a mail piece shipping system utilizing one embodiment of the present invention for delivery by a commercial carrier to a United States Post Office branch location.

The present invention, used in conjunction with the various components of the mail shipping system 100 illustrated in FIGS. 4 and 5, allows a commercial carrier to deliver a mail piece 12 to the USPS, for ultimate delivery to a consignee's post office box 58, while simultaneously providing the consignor 11 with tracking and billing information associated with that mail piece 12. For example, the typical mail shipping system 100 includes a plurality of delivery vehicles 18, sorting facilities (such as a regional sorting facility 19, or hub, and a local sorting facility 20), a shipping computer system 21 and a plurality of delivery information acquisition devices (DIAD's) 22, used to obtain information for delivery and tracking systems.

Together, these various components (and other components as described below) used in conjunction with the P.O. Box recognition/conversion system 13, obtains and records information associated with a mail piece 12 submitted by a consignor 11, sorts the mail piece to an appropriate local sortation hub, and delivers the mail piece to a destination address, such as the post office branch 70 that contains the post office box 58 to which the mail piece 12 is addressed. The system 100 can also correlate the tracking information with the sorting information to generate various reports, manifests and bills. Advantageously, the present invention solves the technical problem of how to accurately and efficiently deliver, track, and bill consignors sending individual mail pieces to post office boxes.

The term "consignor" as used herein describes any person, firm or other entity that is submitting one or more packages, letters or other type of mail pieces 12 for delivery, via the mail shipping system 100, to a Post Office box located within a Post Office branch location 70. More than one consignor can be served by the mail shipping system, but a single consignor is shown in FIG. 4 for simplicity. As shown in FIG. 4, the mail shipping system 100 is employed to efficiently deliver mail pieces 12 originating with a private commercial carrier directly to a post office branch, for ultimate delivery to the destination post office box, for pick-up by the intended recipient. The terms "recipient" or "consignee" as used herein are to be broadly construed and include any person, firm or other entity receiving the mail piece 12.

In the embodiment shown in FIG. 4, the consignor 11 has its own computer system 23 that is connected via a network 24 to the shipping computer system 21. The consignor computer system 23 is configured to interact with the shipping computer system 21 to electronically send and receive information on the mail piece 12 ("mail piece information"). This interaction allows the shipping computer system 21 to provide tracking information evidencing delivery of the mail piece 12 to the Post Office Branch 70 and also provides electronic copies of manifests, bills, reports and other documents associated with the mail piece.

It should be noted that the term "network" as used herein should be construed broadly to include all types of electronically assisted communication such as wireless networks, local area networks, wide area or public networks such as the Internet, public telephone networks, or various combinations of different networks.

Generally described, the preferred embodiment of the present invention functions in a commercial carrier's mail shipping system 100 having a hub and spoke configuration, as taught by prior art and shown in FIG. 4. The hub and spoke shipping system configuration, as shown in FIG. 4, typically incorporates a plurality of regional sorting facilities 19(a-b), otherwise known as "regional hubs." As shown in FIG. 4, a partial illustration of such a mail shipping system 100, includes regions R1 and R2. Region R1 includes many service centers 3, which may be the origin point for a mail piece entrusted to the carrier by a consignor, or the destination point for a mail piece being delivered to a consignee. The carrier may use delivery vehicles to pick up mail pieces and bring them to a service center, or to deliver mail pieces from a service center to a consignee.

In the embodiment illustrated in FIG. 4, the service centers 3 are linked by transport (truck, rail or air) to a district hub 4. Mail pieces going beyond the area served by the service center are transported to the district hub 4, all of which serve a group of service centers. The district hubs of region R1 sort and consolidate mail pieces from two or more service centers 3 for transport either to a different service center for delivery, or to a regional hub 5. The regional hub 5 sorts and consolidates the packages from two or more district hubs 4 for transport either to a different district hub 4, or to a central hub 6 which sorts and consolidates the mail pieces from two or more regional hubs 5 for transport to a different region associated with the mail piece's destination. For example, the destination may be region R2. Alternatively, the mail piece may be shipped directly from one regional hub to another.

The central hub transports mail pieces for destinations in region R2 to the regional hub 19(a) serving region R1. The regional hub 19(a) sorts and segregates such mail pieces for transport to one of a plurality of district hubs 8 associated with the mail piece's destination, where that sub-group of mail pieces is again sorted and segregated for transport, each to one of a plurality of service centers 9 associated with the mail piece's ultimate destination, i.e., a USPS post office box. Each mail piece may then be sorted for each delivery route operating out of that service center. Of course, at the same time the service centers 9, district hubs 8, and the regional hub 7 are sorting and consolidating packages flowing in the other direction in the manner described above in connections with the service centers 3, district hubs 4, and the regional hub 5.

The carrier may also maintain an exception center 11 for the purpose of identifying and dealing with mail pieces that cannot be normally processed through the mail shipping system 100. Exceptions, that is, errors and discrepancies in package handling, may arise because of weather delays, mis-sorting, inability to determine the destination address, lack of a required signature, or other problems. For example, in the past, when a mail piece was addressed to a USPS post office box and an alternate delivery address could not be located, the mail piece would be classified as an "exception." It will be understood that each service center, district hub, and regional hub, as well as the central hub, may be equipped with label scanning devices to acquire address information from package labels, and with automatic sorting equipment. These facilities serve as package consolidation points where packages are sorted and segregated according to their-transit route and final destination.

In the embodiment of the mail shipping system 100 illustrated in FIG. 5, a mail piece 12 that originates at the consignor 11 is delivered by one or more delivery vehicles 18 to a regional sorting facility 19. It is understood by those in the art that the mail piece 12 could have first been directed to one or more service center 3 or district hubs 4 prior to arriving at the regional sorting facility 19. These delivery vehicles used to deliver the mail piece can include various aircraft, trucks, carts, railroads, or any other manual or automatic system or device for transporting the mail pieces 12. The delivery vehicles 18 can be owned and operated by the carrier having the shipping computer system 21, or can be the vehicles of contract carriers hired for particular deliveries and routes, or the delivery vehicles 18 could also be controlled or operated wholly, or partially by the consignor 11. For instance, the initial delivery by the vehicles 18 of the mail pieces 12 to the regional sorting facility 19 may be performed by a truck of the consignor 11.

When a mail piece 12 arrives at a regional sorting facility 19, the mail piece is typically unsorted, i.e., it is mixed in with a plurality of additional mail pieces addressed to various recipients. The regional sorting facility 19 typically sorts the mail pieces 12 based on zip code. In other words, the mail pieces are sorted into a plurality of groups based on the zip code of each of the pieces. Sorting of the mail pieces 12 at the regional sorting facility 19 can be manual or automatic and the operation of such facilities is generally known, and is therefore not described herein in any further detail.

The groups of mail pieces 12, subsequent to the regional sorting, are delivered by one or more delivery vehicles 18 to the local sorting facility 20. Due to the generally larger distances of such deliveries, air transport delivery vehicles are often employed. Of course in cases where the local sorting facility 20 is relatively close, or the same as, the regional sorting facility (e.g., wherein delivery from and to the same zip code by the consignor 11 is desired) ground transport, carts, conveyors and other short distance delivery vehicles 18 may be employed.

After arriving at the local sorting facility 20, the mail piece 12 is scanned by a mail scanning apparatus. The mail scanning apparatus is configured to optically scan, or otherwise electronically obtain, information printed on each of the mail pieces. For instance, if the information is a printed address, including a zip code, the mail scanning apparatus may be configured for optical character recognition (OCR) wherein the image of the printed characters is captured and processed to determine the individual characters. For information in a more machine-friendly format, such as a linear barcode, a two-dimensional MaxiCode symbol or a multi-stacked bar code, the mail scanning apparatus may include a laser scanner or imaging scanner configured to convert the images into one or more reference numbers or strings associated with mail piece information submitted to the mail shipping system 100 by the consignor 11, as will be described in more detail below.

In the embodiment shown in FIG. 5, the mail piece 12 is affixed with a shipping label (not shown but assumed to be identical to the first shipping label 12 of FIGS. 1 & 3) that includes a two-dimensional MaxiCode symbol, as illustrated in FIGS. 1 & 3. The MaxiCode symbol contains, for example, destination information, full delivery address, the name of the recipient, the weight of the mail piece, amount of postage or other payment submitted with the mail piece, its mail classification and an indication of its contents, or other information used to facilitate containerizing, tracking and billing. As illustrated in FIG. 1, the first shipping label 12 often includes a post office box identifier within the destination information. When the mail piece's shipping label contains a post office box identifier, the present invention is used to convert the first shipping label 12 into a second shipping label 14, as illustrated in one embodiment in FIG. 1.

Again, the purpose of the P.O. Box recognition/conversion process 13 is to provide a commercial carrier with the ability to deliver the mail piece 12 to the post office branch containing the post office box listed within the shipping label's 12 address field. Once the first shipping label 12 has been converted into the second shipping label 14, the commercial carrier determines on which particular delivery vehicle 18 to place the mail piece 12, for delivery to the post office branch 70 containing the destination post office box 58. Once loaded, the delivery vehicle 18 delivers the mail piece to the post office branch 70. Upon delivery to the post office branch 70, the mail piece 12 is then further sorted by the postal service 14 using the post office box identifier 25 located on the label 14 and ultimately placed in the consignee's post office box 58.

Figure 6:
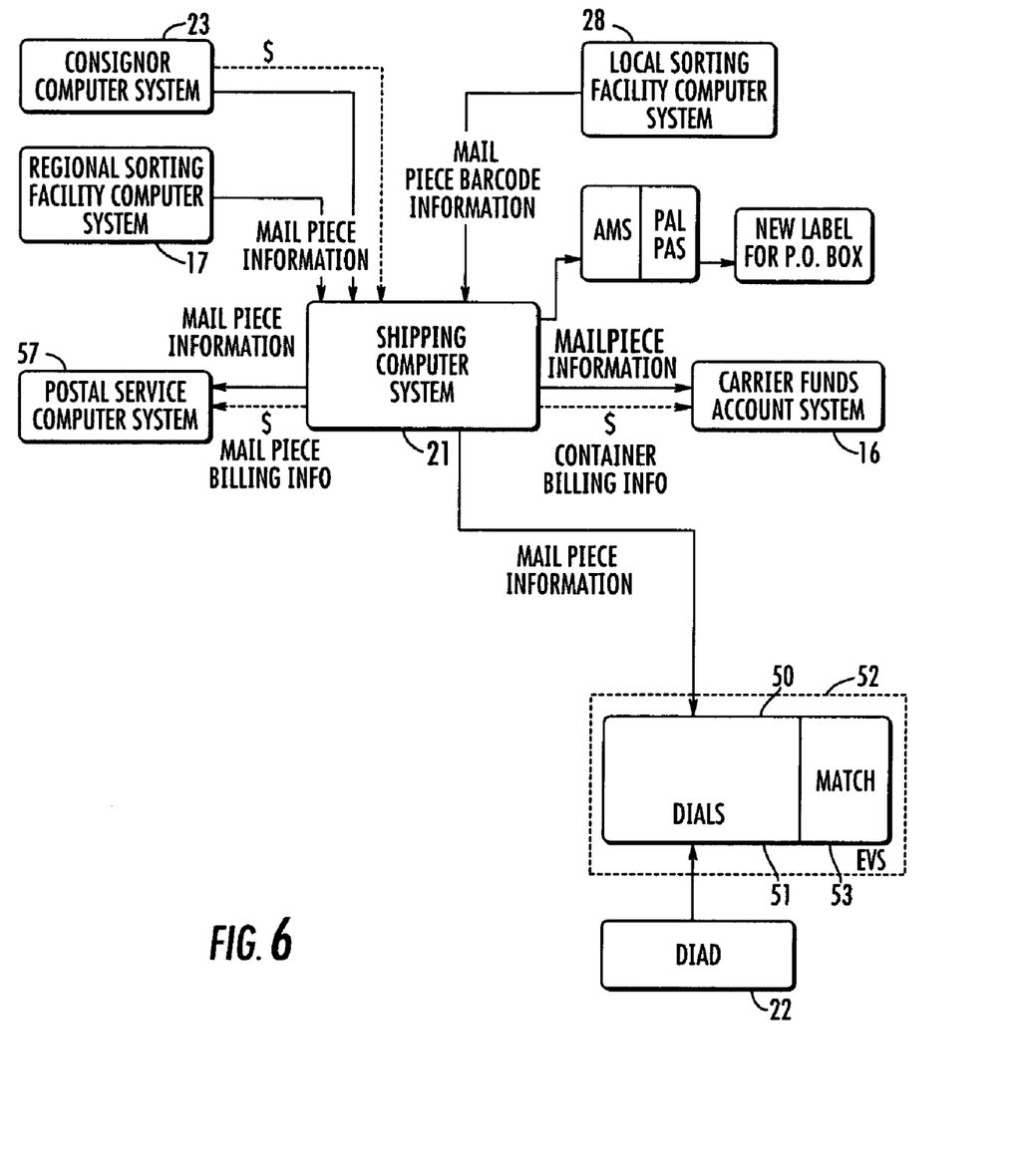
FIG. 6 is a schematic depiction of a mail piece shipping system utilizing one embodiment of the present invention.

Referring now to FIG. 6, it can be seen that the shipping computer system 21 can not only be connected in communication with the consignor computer system 23, but also a regional sorting facility computer system 17, a postal service computer system 57, an electronic verification system (EVS) 52 and a carrier funds account system 16. As will be described below, these connections allow the shipping computer system 21 to coordinate the flow of shipping and tracking information to create manifests and control the flow of funds for payment of the shipping services.

The regional sorting facility computer system 17, shown in FIG. 6, is configured to obtain and send mail piece information to the shipping computer system 21 wherein the mail piece information is obtained during scanning and other processing of the mail pieces 12 at the regional sorting facility 19 of FIG. 5. Likewise, the local sorting facility computer system 28 is configured to obtain and send mail piece information to the shipping computer system 21 wherein the mail piece information is obtained during scanning and other processing of the mail pieces 12 at the local sorting facility 19 of FIG. 5.

The consignor computer system 23 is configured to send billing and funds transfer information (as represented by the intermittent dashed and dotted line and the "$" sign on FIG. 5) to the shipping computer system 21. The billing information preferably includes instructions for an electronic debit or credit of funds in payment for the services provided by the carrier, including funds for delivering the mail piece to the USPS branch location and also funds charged by the USPS for the placement of the mail piece 12 in the destination post office box. These funds may vary by mail piece depending on the characteristics of the mail piece, such as type of delivery (level of service), size, weight and other information that affects the cost of delivery. Therefore, each mail piece 12 would preferably be identified by its barcode/MaxiCode which is associated with its mail piece information and cost information.

In the embodiment illustrated in FIG. 6, the shipping computer system 21 is configured to parse, process, and distribute the mail piece and billing information to the other connected systems. For example, the shipping computer system 21 is configured to send the mail piece information to the electronic verification system 53. Also, the shipping computer system 21 can send the mail piece information correlated with its mail piece billing information, including any funds or instructions to transfer funds associated with the delivery of the mail pieces 12 to the postal service computer system 57, as shown in FIG. 5. The postal service computer system 57 and the carrier funds account system 16 can audit, archive, redistributed or perform other types of desired processing on the information sent by the shipping computer system 21.

The shipping computer system 21 may include logic for calculating the amount of the funds to which the carrier and the postal service are entitled. For instance, the carrier computer system 34 may have logic that determines the total cost of delivering the mail piece 12 to the USPS branch location 70 and the cost charged by the USPS to place the mail piece 12 in the consignor's post office box 58.

An alternative embodiment of the shipping computer system 21 is shown schematically in FIG. 7. The shipping computer system 21 includes a processor 80 that communicates with other elements within the computer system 21 via a bus 81. Also included in the shipping computer system 22 are input and output devices (not shown), including the DIADs used for tracking and various terminals for receiving and displaying data within the system. The shipping computer system 22 further includes memory 84, which preferably includes both read only memory (ROM) 85 and random access memory (RAM) 86. The ROM 85 is used to store a basic input/output system (BIOS) 87 containing the basic routines that help to transfer information between elements within the shipping computer system 21. A system interface enables communication with other computer systems, such as the consignor computer system 23 and the carrier computer system 34.

In addition, the shipping computer system 21 includes at least one storage device 88, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 88 is connected to the system bus by an appropriate interface. The storage devices 88 and their associated computer-readable media provide non-volatile storage for the shipping computer system 22. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices, such as within RAM 86 or within the storage device 88. Such program modules include an operating system 89, a P.O. Box recognition/conversion module 90, a label generating module 93, a tracking module 94, a verification module 96 and a billing module 97. As described both above and below, the P.O. Box recognition/conversion module 90 controls the conversion of the P.O. Box string to the street level address of a USPS branch location. The label generating module 93 generates labels containing at least the street level address of an identified USPS branch location. The tracking module 94 collects tracking information on the movement of the mail piece throughout the mail shipping system. The verification module 96 obtains the tracking information and mail piece information and constructs an audit manifest. The billing module 97 calculates the cost of the various sorting and shipping services and allocates any funds submitted by the consignee accordingly.

It will be appreciated by one of ordinary skill in the art that one or more of the components of the computer systems described herein may be located geographically remotely from other components. Furthermore, one or more of the components may be combined, and additional components performing the functions described herein may be included in the consignor and postal service computer systems 23, 57.

Figure 8:
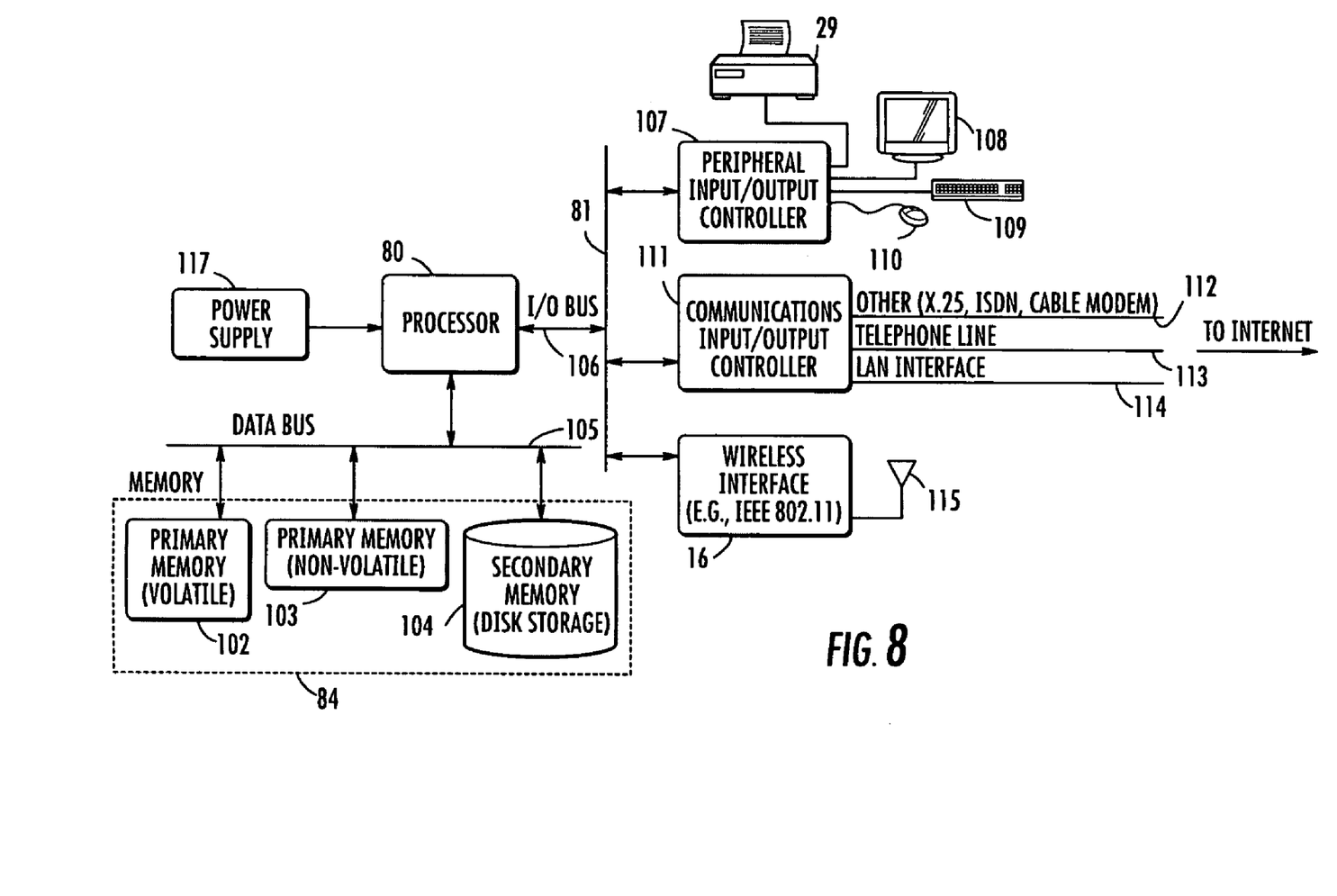
FIG. 8 is another schematic depiction of the computer system shown in FIGS. 6 and 7.

For example, one embodiment of a computer of the mail shipping system 100 is illustrated that can be used to practice aspects of the present invention. In FIG. 8, the processor 80, such as a microprocessor, is used to execute software instructions for carrying out the above-defined steps and functions, such as scanning, recognizing post office box strings, converting post office box strings into street level addresses, etc. The processor receives power from a power supply 117 that also provides power to the other components as necessary. The processor 80 communicates using the data bus 81 that is typically 16 or 32 bits wide (e.g., in parallel). The data bus 81 is used to convey data and program instructions, typically, between the processor and memory. In the present embodiment, memory can be considered primary memory 86 that is RAM or other forms which retain the contents only during operation, or it may be non-volatile 85, such as ROM, EPROM, EEPROM, FLASH, or other types of memory that retain the memory contents at all times. The memory could also be secondary memory 104, such as disk storage, that stores large amount of data. In some embodiments, the disk storage may communicate with the processor using an I/O bus 106 instead or a dedicated bus (not shown). The secondary memory may be a floppy disk, hard disk, compact disk, DVD, or any other type of mass storage type known to those skilled in the computer arts.

The processor 80 also communicates with various peripherals or external devices using an I/O bus 106. In the present embodiment, a peripheral I/O controller 107 is used to provide standard interfaces, such as RS-232, RS422, DIN, USB, or other interfaces as appropriate to interface various input/output devices. Typical input/output devices include local printers, such as the label printer 29, a monitor 108, a keyboard 109, and a mouse 110 or other typical pointing devices (e.g., rollerball, trackpad, joystick, etc.).

The processor 80 typically also communicates using a communications I/O controller 111 with external communication networks, and may use a variety of interfaces such as data communication oriented protocols 112 such as X.25, ISDN, DSL, cable modems, etc. The communications controller 111 may also incorporate a modem (not shown) for interfacing and communicating with a standard telephone line 113. Finally, the communications I/O controller may incorporate an Ethernet interface 114 for communicating over a LAN. Any of these interfaces may be used to access the Internet, intranets, LANs, or other data communication facilitates.

Finally, the processor 80 may communicate with a wireless interface 116 that is operatively connected to an antenna 115 for communicating wirelessly with another devices, using for example, one of the IEEE 802.11 protocols, 802.15.4 protocol, or a standard 3G wireless telecommunications protocols, such as CDMA2000 1x EV-DO, GPRS, W-CDMA, or other protocol.

Those skilled in the art of data networking will realize that many other alternatives and architectures are possible and can be used to practice the principles of the present invention. The embodiments illustrated in FIGS. 7 and 8 can be modified in different ways and be within the scope of the present invention as claimed. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for facilitating the delivery of a mail piece, said method comprising the steps of:
   (A) scanning said mail piece to obtain destination information using a mail scanning device;
   (B) determining, using a shipping computer system, whether said destination information includes a post office box identifier;
   (C) in response to determining the destination information includes a post office box identifier in step (B), determining a street address of a post office location containing said post office box using the shipping computer system;
   (D) affixing said street address of said post office location to said mail piece; and
   (E) delivering said mail piece to said street address.

2. The method of claim 1, wherein said post office box identifier is visible on said mail piece.

3. The method of claim 1, wherein said post office box identifier is in a machine readable format.

4. The method of claim 1, wherein affixing said street address comprises generating a first label including said street address and attaching said first label to said mail piece, and further comprising generating a second label including the post office box identifier and attaching the second label to the mail piece.

5. The method of claim 1, wherein affixing said street address comprises generating a label including said street address and said post office box identifier and attaching said label to said mail piece.

6. The method of claim 4, further comprising placing said mail piece into said post office box.

7. The method of claim 1 wherein said destination information is located on a delivery label attached to said mail piece.

8. A mail delivery system for facilitating the delivery of a mail piece bearing a post office box identifier, said mail delivery system comprising:
   a mail piece scanning apparatus configured to determine destination information located on said mail piece, and;
   a shipping computer system in communication with said mail niece scanning apparatus, wherein the shipping computer system includes a processor in communication with a memory and wherein further the shipping computer system is configured to:
   determine if a post office box identifier is included within said destination information, wherein said post office box identifier identifies a post office box;
   determine a street address of a post office location containing said post office box; and
   address said mail piece with at least said street address of said post office location containing said post office box.

9. The mail delivery system of claim 8 further including an apparatus selected from a label generator, a printer, or an RFID encoder in communication with the shipping computer system.

10. The mail delivery system of claim 8 wherein said shipping computer system is configured to recognize a zip code included within said destination information.

11. The mail delivery system of claim 10, wherein said shipping computer system is configured to determine said street address of said post office location using said post office box identifier and said zip code.

12. The mail delivery system of claim 8 wherein said shipping computer system is configured to generate a label including the street address.

13. The mail delivery system of claim 12, wherein said label further includes said post office box identifier.

14. A method of delivering a mail piece to a post office box comprising the steps of:
- (A) a first party taking possession of said mail piece, wherein said mail piece includes destination information;
- (B) scanning said mail piece to obtain said destination information using a scanning device;
- (C) determining, using a shipping computer system, whether the destination information contains a post office box identifier;
- (D) in response to determining the destination information includes a post office box identifier in step (C), associating said post office box identifier with a street address of a post office location containing said post office box using the shipping computer system;
- (E) printing a label containing said post office location's street address; and
- (F) delivering said mail piece to said street address.

15. The method of claim 14 further comprising the step of affixing said label to said mail piece.

16. The method claim 14 further comprising placing said mail piece into said post office box.

17. The method of claim 14 wherein said destination information is contained on a delivery label affixed to said mail piece.

18. The method of claim 14 wherein said first party is a commercial carrier.

19. The method of claim 18 wherein said commercial carrier and a second party each charge for delivering said mail piece to said post office box.

* * * * *

UNITED STATES PATENT AND TRADEMARK OFFICE
CERTIFICATE OF CORRECTION

PATENT NO. : 7,657,439 B2
APPLICATION NO. : 11/379241
DATED : February 2, 2010
INVENTOR(S) : Nagesh Kadaba It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 935 days.

Signed and Sealed this

Thirtieth Day of November, 2010

David J. Kappos
*Director of the United States Patent and Trademark Office*